(12) United States Patent
Lee

(10) Patent No.: US 11,899,169 B2
(45) Date of Patent: Feb. 13, 2024

(54) LENS ASSEMBLY AND ELECTRONIC DEVICE INCLUDING THE SAME

(71) Applicant: SAMSUNG ELECTRONICS CO., LTD., Suwon-si (KR)

(72) Inventor: Kiwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 17/338,250

(22) Filed: Jun. 3, 2021

(65) Prior Publication Data

US 2022/0179171 A1 Jun. 9, 2022

(30) Foreign Application Priority Data

Dec. 3, 2020 (KR) .......................... 10-2020-0167285

(51) Int. Cl.
*G02B 13/00* (2006.01)
*G02B 3/00* (2006.01)
*G02B 9/12* (2006.01)

(52) U.S. Cl.
CPC ....... *G02B 13/0035* (2013.01); *G02B 3/0062* (2013.01); *G02B 9/12* (2013.01)

(58) Field of Classification Search
CPC .............. G02B 13/0035; G02B 3/0062; G02B 3/0056; G02B 13/02; G03B 9/02; G03B 30/00
See application file for complete search history.

(56) References Cited

U.S. PATENT DOCUMENTS

| 9,158,095 | B2 | 10/2015 | Baba |
| 9,223,118 | B2 | 12/2015 | Mercado |
| 9,392,188 | B2 | 7/2016 | Shabtay et al. |
| 9,557,627 | B2 | 1/2017 | Mercado |
| 2006/0087748 | A1* | 4/2006 | Choi .................... G02B 13/006 359/784 |

(Continued)

FOREIGN PATENT DOCUMENTS

| GB | 550519 A | 1/1943 |
| JP | 2005-341301 A | 12/2005 |

(Continued)

OTHER PUBLICATIONS

Communication dated Feb. 9, 2022 issued by the European Patent Office in European Application No. 21191504.6.

(Continued)

*Primary Examiner* — Alicia M Harrington
(74) *Attorney, Agent, or Firm* — Sughrue Mion, PLLC

(57) ABSTRACT

Provided is a lens assembly including a first lens array including a first lens having positive refractive power, a second lens array including a second lens having negative refractive power, and a third lens array including a third lens having negative refractive power, wherein the first lens array, the second lens array, and the third lens array are sequentially provided from an object side toward an image sensor side, wherein the first lens has a biconvex shape that is convex toward the object side and convex toward the image sensor side, and wherein each of the second lens and the third lens has a meniscus shape that is convex toward the image sensor side.

18 Claims, 12 Drawing Sheets

(56) References Cited

U.S. PATENT DOCUMENTS

| | | | | |
|---|---|---|---|---|
| 2010/0231686 | A1* | 9/2010 | Goto | G02B 13/06 |
| | | | | 359/753 |
| 2011/0310493 | A1 | 12/2011 | Park et al. | |
| 2016/0161712 | A1 | 6/2016 | Jang et al. | |

FOREIGN PATENT DOCUMENTS

| | | | |
|---|---|---|---|
| JP | 2007-47513 A | 2/2007 | |
| JP | 5052144 B2 | 10/2012 | |
| JP | 6628242 B2 | 1/2020 | |
| KR | 10-1708895 B1 | 2/2017 | |
| KR | 10-1757101 B1 | 7/2017 | |
| WO | 2011/063347 A2 | 5/2011 | |
| WO | 2014/144157 A1 | 9/2014 | |
| WO | 2014/181643 A1 | 11/2014 | |
| WO | WO-2018139280 A1 * | 8/2018 | ......... G02B 13/0085 |

OTHER PUBLICATIONS

Communication dated Jun. 17, 2022 issued by the European Patent Office in counterpart European Application No. 21191504.6.

* cited by examiner

LENS ASSEMBLY AND ELECTRONIC DEVICE INCLUDING THE SAME

CROSS-REFERENCE TO RELATED APPLICATION

This application claims priority to Korean Patent Application No. 10-2020-0167285, filed on Dec. 3, 2020 in the Korean Intellectual Property Office, the disclosure of which is incorporated by reference herein in its entirety.

BACKGROUND

1. Field

Example embodiments of the present disclosure relate to a lens assembly and an electronic device including the same, and methods thereof.

2. Description of Related Art

With developments of optical technology and image processing technology, an imaging device is widely utilized in a field such as multimedia contents, security, and recognition. For example, the imaging device may be mounted on a mobile device, a camera, a vehicle, and a computer to capture an image, recognize an object, or acquire data for controlling the device. A volume of the imaging device may be determined based on a size of a lens, a focal length of a lens, and a size of a sensor. When the size of the lens decreases, the focal length of the lens may also decrease. To reduce the volume of the imaging device, multiple lenses including small lenses may be used.

SUMMARY

One or more example embodiments may provide a lens assembly and an electronic device including the same.

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a lens assembly including a first lens array including a first lens having positive refractive power, a second lens array including a second lens having negative refractive power, and a third lens array including a third lens having negative refractive power, wherein the first lens array, the second lens array, and the third lens array are sequentially provided from an object side toward an image sensor side, wherein the first lens has a biconvex shape that is convex toward the object side and convex toward the image sensor side, and wherein each of the second lens and the third lens has a meniscus shape that is convex toward the image sensor side.

Where a total track length of the lens assembly is TTL and a combined focal length of the lens assembly is f, a telephoto ratio of the lens assembly may satisfy TTL/f<1.0.

Where a field of view of the lens assembly is FoV, the field of view may satisfy 0.25<tan(FoV)<0.5.

Where a focal length of the second lens is f2 and a focal length of the third lens is f3, a power configuration of the lens assembly may satisfy 1.6<(1/f3)/(1/f2)<2.5.

At least one of the first lens, the second lens, and the third lens may be an aspherical lens formed of a plastic material.

At least one of the first lens array, the second lens array, and the third lens array may have a 3*3 lens arrangement or 5*5 lens arrangement.

The lens assembly may further include an aperture stop provided between the first lens array and the second lens array.

An effective aperture of the first lens may be smaller than a diameter of an image circle.

According to another aspect of an example embodiment, there is provided a lens assembly including a first lens having positive refractive power, a second lens having negative refractive power, and a third lens having negative refractive power, wherein the first lens, the second lens, and the third lens are sequentially provided from an object side toward an image sensor side, wherein the first lens has a biconvex shape that is convex toward the object side and the image sensor side, wherein each of the second lens and the third lens has a meniscus shape that is convex toward the image sensor side, and wherein, where a total track length of the lens assembly is TTL, a combined focal length of the lens assembly is f, and a field of view of the lens assembly is FoV, a telephoto ratio of the lens assembly satisfies TTL/f<1.0, and the field of view satisfies 0.25<tan(FoV)<0.5.

Where a focal length of the second lens is f2 and a focal length of the third lens is f3, a power configuration of the lens assembly may satisfy 1.6<(1/f3)/(1/f2)<2.5.

At least one of the first lens, the second lens, and the third lens may be an aspherical lens formed of a plastic material.

The lens assembly may further include an aperture stop provided between the first lens and the second lens.

The first lens, the second lens, and the third lens may be included in lens arrays that are provided in different layers.

According to yet another aspect of an example embodiment, there is provided an electronic device including a first imaging device configured to capture first visual information through a first lens assembly at a first field of view, and a display configured to display a captured image based on sensing information corresponding to the first visual information, wherein the first lens assembly may include a first lens array including a first lens having positive refractive power, a second lens array including a second lens having negative refractive power, and a third lens array including a third lens having negative refractive power, wherein the first lens array, the second lens array, and the third lens array are sequentially provided from an object side toward an image sensor side, wherein the first lens has a biconvex shape that is convex toward the object side and convex toward the image sensor side, and wherein each of the second lens and the third lens has a meniscus shape that is convex toward the image sensor side.

The electronic device may further include a second imaging device configured to capture second visual information through a second lens assembly at a second field of view, wherein the first field of view is narrower than the second field of view.

The first imaging device and the second imaging device may be provided on a substrate.

A first image sensor included in the first imaging device and a second image sensor included in the second imaging device may be provided on a same plane.

Where a total track length of the first lens assembly is TTL and a combined focal length of the first lens assembly is f, a telephoto ratio of the first lens assembly may satisfy TTL/f<1.0.

Where a field of view of the first lens assembly is FoV, the field of view may satisfy 0.25<tan(FoV)<0.5.

Where a focal length of the second lens is f2 and a focal length of the third lens is f3, a power configuration of the first lens assembly may satisfy $1.6<(1/f3)/(1/f2)<2.5$.

According to yet another aspect of an example embodiment, there is provided an device assembly including a substrate, a first imaging device provided on the substrate and configured to capture first visual information through a first lens assembly at a first field of view, the first lens assembly including a first lens array including a first lens having positive refractive power, a second lens array including a second lens having negative refractive power, and a third lens array including a third lens having negative refractive power, wherein the first lens array, the second lens array, and the third lens array are sequentially provided from an object side toward an image sensor side, wherein the first lens has a biconvex shape that is convex toward the object side and convex toward the image sensor side, and wherein each of the second lens and the third lens has a meniscus shape that is convex toward the image sensor side, and a second imaging device provided on the substrate and configured to capture second visual information through a second lens assembly at a second field of view that is different from the first field of view.

BRIEF DESCRIPTION OF THE DRAWINGS

The above and/or other aspects will be more apparent by describing certain example embodiments with reference to the accompanying drawings, in which.

DETAILED DESCRIPTION

Figure 1A:
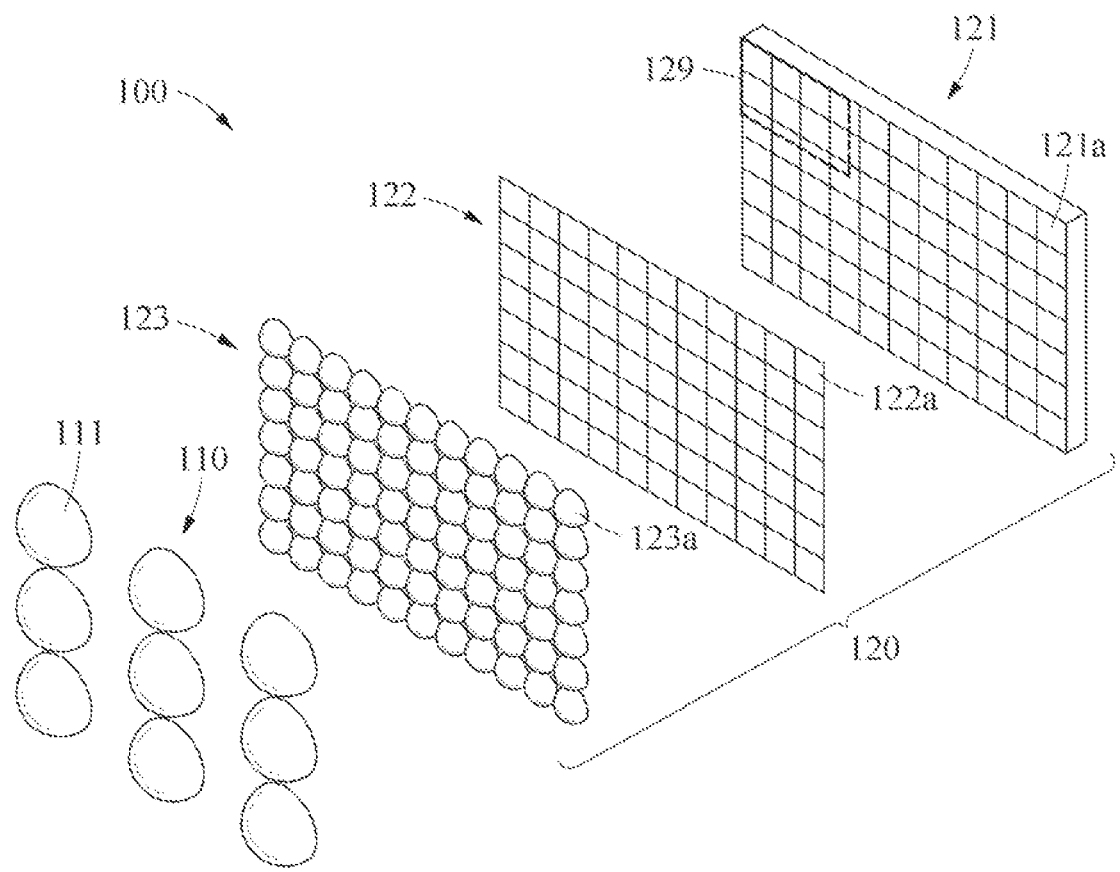
FIGS. 1A and 1B illustrate a structure of an imaging device according to an example embodiment.

The following structural or functional descriptions are exemplary to merely describe the example embodiments, and the scope of the example embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, reference will now be made in detail to example embodiments, examples of which are illustrated in the accompanying drawings. Regarding the reference numerals assigned to the elements in the drawings, it should be noted that the same elements will be designated by the same reference numerals, and redundant descriptions thereof will be omitted.

Figure 1B:
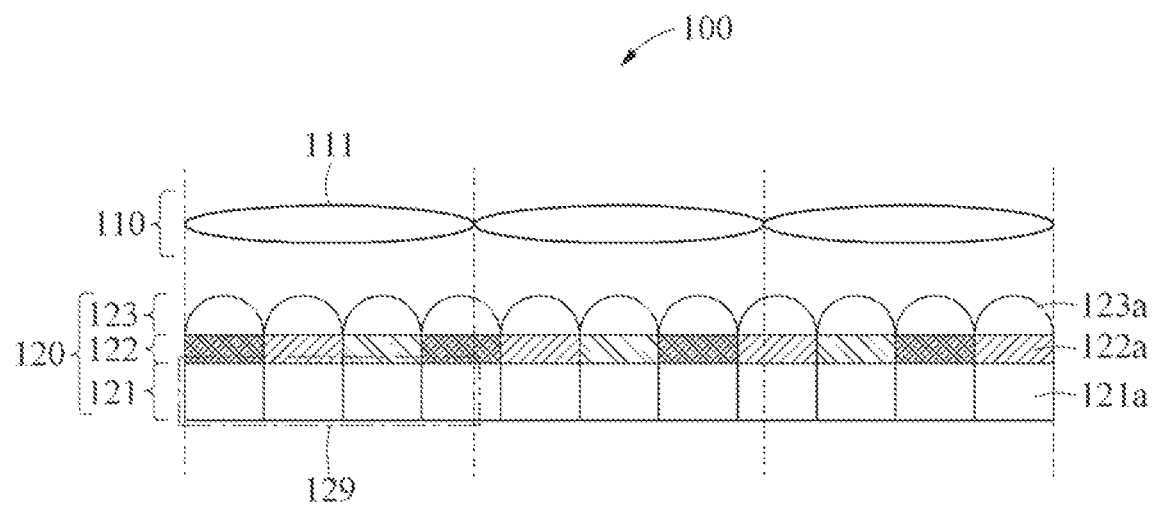

FIGS. 1A and 1B illustrate a structure of an imaging device according to an example embodiment. FIG. 1A is a perspective view of the imaging device and FIG. 1B is a cross-sectional view of the imaging device.

An imaging device 100 includes a lens array 110 and an image sensor 120. The lens array 110 may include lens elements, and the image sensor 120 includes sensing elements. The lens elements may be arranged along a plane of the lens array 110. The sensing elements may be arranged along a plane of a sensing array 121 in the image sensor 120. The plane of the lens array 110 may be placed parallel to the plane of the sensing array 121. The lens array 110 may be a multi-lens array (MLA) for imaging, and may also be referred to as an "imaging lens array."

In the present disclosure, an optical sensing element (hereinafter, also referred to as a "sensing element") may be an element that senses optical information based on light incident onto the corresponding element and may output a value indicating an intensity of the incident light. The optical sensing element may include, for example, a complementary metal-oxide-semiconductor (CMOS), a charge-coupled device (CCD), and a photodiode.

In the present disclosure, a picture element (hereinafter, referred to as a "pixel") is basic unit information constituting an image and may indicate optical information obtained by a sensing element sensing light reflected at a physical position on a an object corresponding to a pixel position. The pixel position is a position of a pixel in an image and based on a pixel coordinate system. The physical position may be based on a world coordinate system.

A pixel constituting a color image may have a plurality of color values (for example, in a case of an RGB color system, a red value, a green value, and a blue value) for one pixel position. In a field of a display, a unit pixel constituting the display may include sub-pixels (for example, in a case of the RGB color system, a red sub-pixel, a green sub-pixel, and a blue sub-pixel) for a plurality of colors to represent color values of one pixel position. In contrast, in a field of an image sensor, a pixel is not divided into sub-pixels for each color and generally refers to a sensing element (for example, a photodiode with a color filter disposed at the front) that senses one color value. In addition, in the field of the image sensor, a pixel refers to a sensing element and a value sensed by the sensing element, interchangeably. In the present disclosure, for clarity, a pixel is basic unit information constituting an image and a sensing element is a hardware element that outputs a pixel value of a corresponding pixel in response to light being received from an object.

The following description is based on an example in which each pixel uses a value output from a single sensing element, but embodiments are not limited thereto. One pixel may be expressed as a combination of values output from a plurality of sensing elements. A plurality of sensing elements grouped to express one pixel may be referred to as a sensing element group.

The image sensor 120 may include the sensing array 121, an optical filter 122, and a condensing lens array 123. However, embodiments are not limited thereto. An individual condensing micro-lens 123a included in the condensing lens array 123 may have an optical characteristic that passes light of a predetermined wavelength band and blocks light of remaining wavelength bands.

The condensing lens array 123 may include a plurality of condensing micro-lenses configured to concentrate light passing through the lens array 110 onto the sensing array 121. For example, the condensing lens array 123 may include the same number of condensing micro-lenses as the number of sensing elements included in the sensing array 121. The plurality of condensing micro-lenses may be arranged between an imaging optical lens and the sensing array 121 to concentrate light passing through the imaging optical lens and transmit the concentrated light to a sensing element 121a corresponding to the condensing micro-lens 123a. For example, as illustrated in FIG. 1B, the condensing micro-lens 123a may be disposed on the sensing element 121a of the sensing array 121 to concentrate the light onto the sensing element 121a located therebelow. In addition, as illustrated in FIG. 1B, a color filter 122a may be disposed between the condensing micro-lens 123a and the sensing element 121a.

The optical filter 122 may have an optical characteristic that passes light of a predetermined wavelength band and blocks light of remaining wavelength bands. For example, the optical filter 122 may be implemented as a color filter array (CFA) including a plurality of color filters arranged along a filter plane. The color filter 122a may be a filter that passes light of a wavelength band corresponding to a predetermined color and blocks light of remaining bands. As an example, the color filter 122a may include a red-pass filter, a green-pass filter, and a blue-pass filter. The red-pass filter may pass light of a wavelength band corresponding to red color and blocks light of remaining bands. The green-pass filter may pass light of a wavelength band corresponding to green color and blocks light of remaining bands. The blue-pass filter may pass light of a wavelength band corresponding to blue color and blocks light of remaining bands. As another example, the color filter 122a may be a CYGM filter. The CYGM indicates a filter that passes colors of cyan, yellow, green, and magenta. In the color filter array, color filters individually passing color light may be arranged in a Bayer pattern or other patterns along a filter plane. Other patterns may be, for example, a CYGM pattern, an RGBE pattern (E being emerald), an RGBW pattern (W being white), a CYYM pattern (with two yellows), and a Foveon pattern (a layer structure of a filter).

The optical filter 122 may also be an infrared cut filter that passes a visible ray band and blocks an infrared ray band. As another example, the optical filter 122 may include a color filter array and an infrared cut filter.

A quality of an image captured and restored by the image sensor 120 may be determined based on the number of sensing elements included in the sensing array 121 and an amount of light incident on the sensing element 121a. For example, a resolution of the image may be determined based on the number of sensing elements included in the sensing array 121. Also, a sensitivity of the image may be determined based on the amount of light incident on the sensing element 121a. The amount of light incident on the sensing element 121a may be determined based on a size of the sensing element 121a. As the size of the sensing element 121a increases, the amount of incident light may increase, which may increase a dynamic range of the sensing array 121. Accordingly, as the number of sensing elements included in the sensing array 121 increases, a resolution of an image acquired by the image sensor 120 may increase. Also, as the size of the sensing element 121a increases, the image sensor 120 may operate more advantageously for capturing a high-sensitivity image at a low illumination.

An individual lens element 111 of the lens array 110 may cover a predetermined sensing area 129 of the sensing array 121 corresponding to the lens size of the individual lens element 111. The sensing area 129 covered by the lens element 111 in the sensing array 121 may be determined based on the lens size of the lens element 111. The sensing area 129 may indicate an area on the sensing array 121, where rays of a predetermined field of view (FOV) range reach after passing through the corresponding lens element 111. A size of the sensing area 129 may be expressed by a distance or a diagonal length from a center of the sensing area 129 to an outermost point. Light passing through the individual lens element 111 may be incident onto the sensing elements of the sensing array 121 included in the sensing area 129.

FIG. 1 illustrates the imaging device 100 including the lens array 110 with a single layer, however, embodiments are not limited thereto. In some cases, the imaging device 100 may include multiple layers of lens arrays 110. In such cases, rays in a range of a predetermined field of view may reach the sensing area 129 through a combination of specific lenses of the multiple layers of lens arrays. The combination of these lenses may serve as the individual lens element 111. Accordingly, the description of the single layer may also apply to the multiple layers within an acceptable range. The multiple layers will be described later in greater detail.

Each of the sensing elements of the sensing array 121 may generate sensing information based on the rays passing through lenses of the lens array 110. For example, the sensing element 121a may generate sensing information corresponding to a value of an intensity of the light received through the lens element 111. Based on the sensing information output by the sensing array 121, intensity information corresponding to an original signal related to points included in a field of view of the imaging device 100 may be determined, so that a captured image is generated based on the determined intensity information. For example, the individual sensing element 121a of the sensing array 121 may be an optical sensing element including a CMOS, a CCD, a photodiode, and the like.

In addition, the sensing element 121a may generate a color intensity value corresponding to a desired color as sensing information by sensing the light passing through the color filter 122a. Each of the plurality of sensing elements included in the sensing array 121 may be disposed to sense a color different from that sensed by a neighboring sensing element disposed spatially adjacent thereto.

When a diversity of sensing information is sufficiently secured and a full rank relationship is formed between the sensing information and original signal information corresponding to the points included in the field of view of the imaging device 100, a captured image corresponding to a maximum resolution of the sensing array 121 may be acquired. The diversity of the sensing information may be secured based on parameters of the imaging device 100 such as the number of lenses included in the lens array 110 and the number of sensing elements included in the sensing array 121.

In the structure of the multi-lens array for imaging, the imaging optical lens and the sensing array 121 may be arranged based on a fractional alignment structure. For example, the fractional alignment structure may be a structure in which the sensing area 129 covered by the individual lens element 111 includes a non-integer number of sensing elements.

When the lens elements included in the lens array 110 have the same lens size, the number of lens elements included in the lens array 110 and the number of sensing elements included in the sensing array 121 may be in a relatively prime relationship. A ratio P/L between a number L of lens elements corresponding to one axis of the lens array 110 and a number P of sensing elements corresponding to one axis of the sensing array 121 may be determined to be a real number. Each of the lens elements may cover the same number of sensing elements as pixel offsets corresponding to P/L. For example, the sensing area 129 of FIG. 1A may include 2.3 (=7/3) sensing elements along a vertical axis and 3.67 (=11/3) sensing elements along a horizontal axis. Further, the lens element 111 may cover a plurality of non-integer condensing micro-lenses. For example, each of the plurality of imaging optical lenses may transfer light received from outside to non-integer number of sensing elements. Accordingly, in the image sensor 120, the number of condensing micro-lenses may be the same as the number of sensing elements of the sensing array 121. Also, the number of lens elements (e.g., imaging optical lenses) of the lens array 110 may be less than the number of condensing micro-lenses.

In the fractional alignment structure of the imaging device 100 as described above, an optical center axis (OCA) of each lens element 111 may be arranged to be slightly different with respect to the sensing array 121. For example, the lens element 111 may be disposed to be eccentric with respect to the sensing element 121a. Accordingly, each lens element 111 of the lens array 110 may receive different light field information. The light field information received by the fractional alignment structure is described with reference to FIG. 2.

Figure 2:
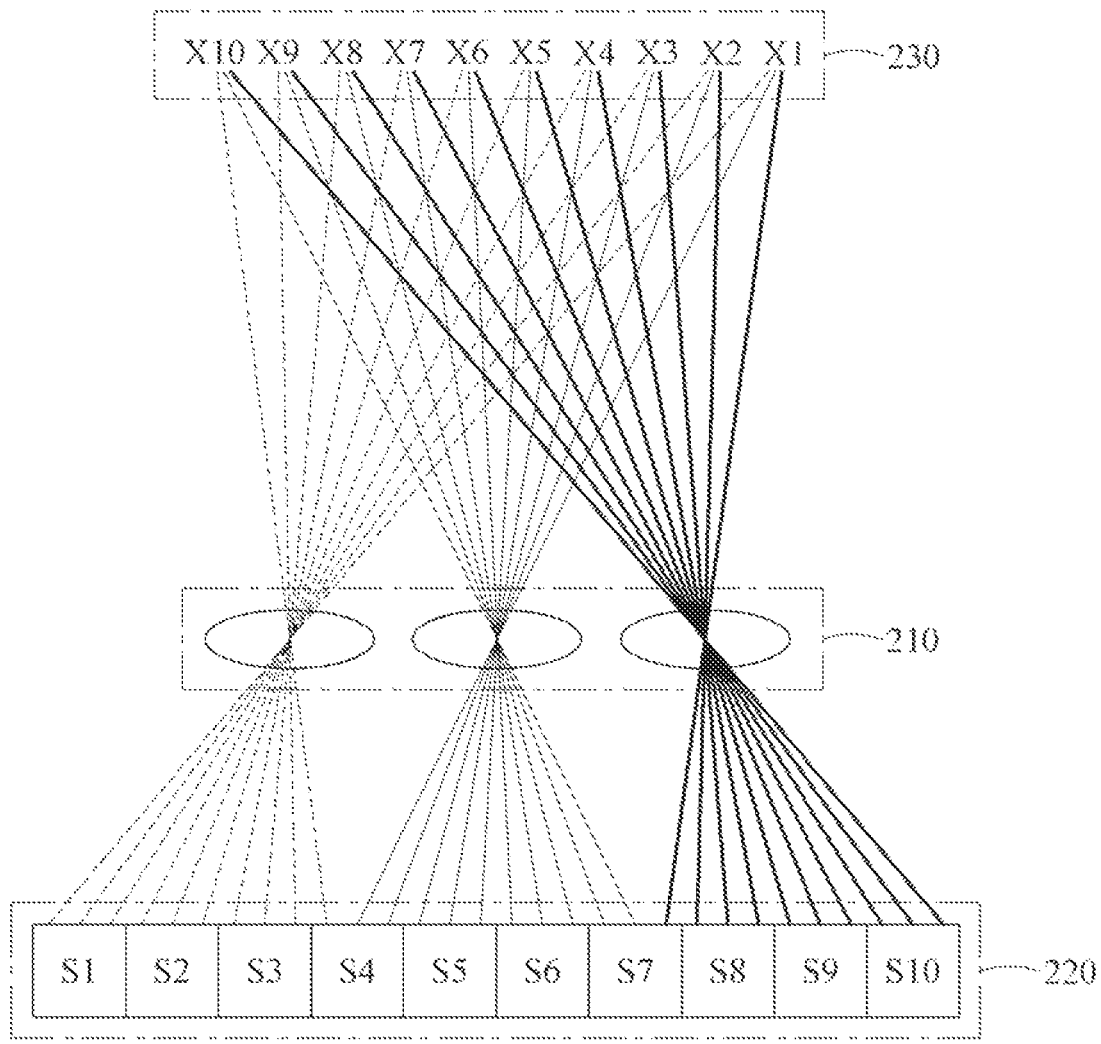
FIG. 2 illustrates a sensing element receiving a ray through a lens element according to an example embodiment.

FIG. 2 illustrates a sensing element receiving a ray through a lens element according to an example embodiment.

A light field may be emitted from a predetermined target point and may be a field indicating directions and intensities of rays reflected at a predetermined point on an object. Light field information may be information obtained by combining a plurality of light fields. Since a direction of a chief ray of each lens element may also be changed, different light field information may be received in sensing areas. Accordingly, the imaging device may optically acquire more sensing information.

As illustrated in FIG. 2, a sensing array 220 may receive and detect rays corresponding to individual points 230 (e.g., X1 through X10). A plurality of rays emitted from the individual points 230 may form light fields. Rays emitted from a first point (e.g., X1) may form a first light field and be incident onto a first sensing element (e.g., S1), a fourth sensing element (e.g., S4), and a seventh sensing element (e.g., S7). Rays emitted from remaining points X2 through X10 may also form corresponding light fields. The individual points 230 may be points on a predetermined object, for example, an object. The rays emitted from the individual points 230 may be rays such as sunlight reflected from the object. As a cross-sectional view illustrating an example of an imaging device, FIG. 2 illustrates a lens array 210 including three lens elements along one axis and the sensing array 220 including ten sensing elements S1 through S10 for convenience of description. However, embodiments are not limited thereto.

The sensing elements S1 through S10 may sense rays passing through a plurality of lens elements and overlapping one another. The sensing element S1 may generate overlapping sensing information, for example, an intensity value of the rays emitted from the points X1 through X3. Likewise, the sensing elements S2 through S10 may also generate overlapping sensing information. The image sensor may restore the overlapping sensing information.

The sensing information generated by the sensing elements S1 through S10 shown in FIG. 2 may be modeled as original signal information, for example, an intensity value corresponding to the ray incident from the points 230 according to Equation 1 below.

$$S = T \cdot X \qquad \text{[Equation 1]}$$

In Equation 1, S denotes a matrix indicating sensing information, for example, a detected intensity value sensed by individual sensing elements. X denotes a matrix indicating signal values corresponding to rays incident from the individual points onto the sensing elements S1 through S10, for example, color intensity values of the incident rays. T denotes a transformation matrix, and may indicate a relationship between the sensing information sensed by the sensing elements S1 through S10 and signal information corresponding to incident light. In the structure shown in FIG. 2, the rays corresponding to the individual points X1 through X10, the lens elements, and the sensing elements S1 through S10 may be modeled as shown in Equation 2 below. In Equation 2, the individual points X1 through X10 may be modeled as being located at infinite focal points from the image sensor. Distances between the individual points X1 through X10 and the image sensor may each be greater than a threshold distance.

$$\begin{bmatrix} S1 \\ S2 \\ S3 \\ S4 \\ S5 \\ S6 \\ S7 \\ S8 \\ S9 \\ S10 \end{bmatrix} = \begin{bmatrix} 1 & 1 & 1 & 0 & 0 & 0 & 0 & 0 & 0 & 0 \\ 0 & 0 & 0 & 1 & 1 & 1 & 0 & 0 & 0 & 0 \\ 0 & 0 & 0 & 0 & 0 & 0 & 1 & 1 & 1 & 0 \\ 1 & 1 & 0 & 0 & 0 & 0 & 0 & 0 & 0 & 1 \\ 0 & 0 & 1 & 1 & 1 & 0 & 0 & 0 & 0 & 0 \\ 0 & 0 & 0 & 0 & 0 & 1 & 1 & 1 & 0 & 0 \\ 1 & 0 & 0 & 0 & 0 & 0 & 0 & 0 & 1 & 1 \\ 0 & 1 & 1 & 1 & 0 & 0 & 0 & 0 & 0 & 0 \\ 0 & 0 & 0 & 0 & 1 & 1 & 1 & 0 & 0 & 0 \\ 0 & 0 & 0 & 0 & 0 & 0 & 0 & 1 & 1 & 1 \end{bmatrix} \cdot \begin{bmatrix} X1 \\ X2 \\ X3 \\ X4 \\ X5 \\ X6 \\ X7 \\ X8 \\ X9 \\ X10 \end{bmatrix} \quad \text{[Equation 2]}$$

In Equation 2, for convenience of description, ray signal information corresponding to the individual points X1 through X10, for example, ray intensity values are denoted as X1 through X10. In addition, sensing information sensed by the sensing elements S1 through S10, for example, sensing intensity values are denoted as S1 through S10. A relationship, for example, the aforementioned transformation matrix between the sensing information corresponding to the sensing elements S1 through S10 included in the sensing array 220 and original signals corresponding to the rays incident from the individual points X1 through X10 may be determined based on the arrangement of the lens elements and the sensing elements, the number of lens elements included in the lens array 210, the number of sensing elements S1 through S10 included in the sensing array 220, and the like.

Equation 2 corresponds to a case in which the individual points X1 through X10 are infinite focal points from the image sensor. When the individual points X1 through X10 are located at finite focal points from the image sensor, an original signal received in each sensing element may vary based on a distance between an object and the image sensor and a geometric structure of the image sensor.

As described above, the imaging device may acquire a plurality of low-resolution input images based on various sensing information acquired, and restore an output image with a higher resolution than that of the low-resolution input images from the low-resolution input images. A method of generating a single image by rearranging a plurality of low-resolution input images is described with reference to FIG. 3.

Figure 3:
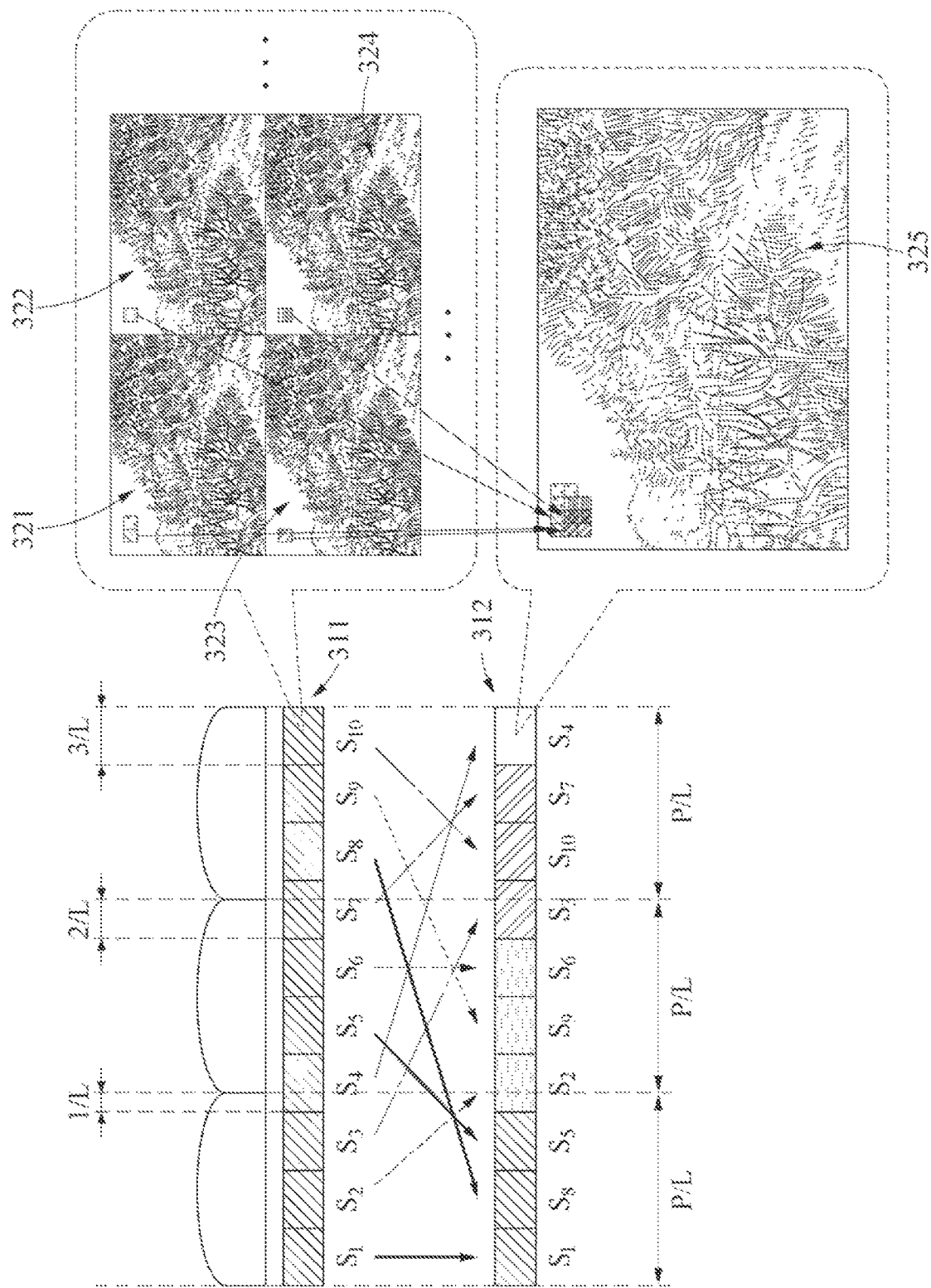
FIG. 3 illustrates a relationship between a number of sensing elements and a number of lens elements according to an example embodiment.

FIG. 3 illustrates a relationship between a number of sensing elements and a number of lens elements according to an example embodiment.

As described above, an imaging optical lens and a sensing array may be arranged in a fractional alignment structure. FIG. 3 illustrates an example in which a ratio P/L between a number L of lens elements and a number P of sensing elements is 10/3.

According to the geometric structure of the lens array and sensing array described above, sensing elements covered by each lens element may receive light field information different from light field information sensed by a sensing element covered by another lens element. In the structure of FIG. 2, the first sensing element S1 may receive light field information including a combination of a first light field of the first point X1, a second light field of the second point X2, and a third light field of the third point X3. In contrast, in the structure of FIG. 2, a second sensing element (e.g., S2) neighboring the first sensing element S1 may receive light field information including a combination of a fourth light field, a fifth light field, and a sixth light field. As such, each sensing element may receive light field information different from light field information sensed in another sensing element.

To restore an image of a high resolution, an imaging device and/or image sensor may rearrange in-image pixel positions of pixels indicating the same or adjacent positions on an object in a plurality of captured low-resolution images based on a correlation between light field information. A pixel is a picture element and may indicate a unit element constituting an image. The pixel position is a position of a pixel in an image and may include coordinates of the pixel. For example, the imaging device and/or the image sensor may construct pixel information of a high-resolution image by contiguously rearranging pixel positions of pixels corresponding to sensing elements receiving similar light field information to be adjacent to each other. As described above, each sensing element may receive light field information in which a plurality of light fields overlap. In terms of two items of light field information sensed by two sensing elements, a correlation between the two items of light field information may increase as one light field information includes more of the same light field as another light field information.

The rearrangement of the pixel positions of the pixels may be performed based on a depth at which the corresponding pixel is captured. As an example, the depth at which the pixel is captured may be set to a predetermined depth value, estimated through stereo image matching, or measured by a depth sensor. As another example, the rearrangement of the pixel positions of the pixels may also be performed by a neural network designed to rearrange the pixel positions based on a depth at which an object is captured without measuring and/or estimating the depth at which the pixel is captured. The aforementioned rearrangement of the pixel positions may also be referred to as a pixel shuffle. For example, a neural network designed to output a single output image from an input compound-eye vision image may be used to rearrange the pixel positions of the pixels. The neural network may be trained based on a training data set obtained by capturing an object at various depths.

The image sensor may assume that points reflecting rays are located at infinite focal points farther than a threshold distance from the image sensor, and determine light field information to be sensed in each sensing element. The image sensor may determine points emitting light fields sensed in each of a plurality of sensing elements based on a positional relationship between the sensing elements and the rays emitted from points farther than the threshold distance. The image sensor may rearrange the pixel positions of the pixels such that pixel positions of pixels corresponding to an output value output by a sensing element receiving light fields emitted from points spatially adjacent to each other on the subject are adjacent.

For reference, FIG. 2 shows the individual points X1 through X10 in an order of being spatially adjacent to each other at an infinite focal distance. The first point X1 may be adjacent to the second point X2. The second point X2 may be adjacent to the first point X1 and the third point X3.

Among sensing elements 311 not rearranged yet, light field information sensed in the first sensing element S1 and light field information sensed in an eighth sensing element (e.g., S8) may include light fields corresponding to the second point X2 and the third point X3. Accordingly, the first sensing element S1 and the eighth sensing element S8 may receive similar light field information. Equation 3 represents a result obtained by rearranging pixel positions of pixels corresponding to the similar light field information according to Equation 2 above. According to example embodiments, a pixel position may be coordinates at which a pixel is positioned.

$$\begin{bmatrix} S1 \\ S8 \\ S5 \\ S2 \\ S9 \\ S6 \\ S3 \\ S10 \\ S7 \\ S4 \end{bmatrix} = \begin{bmatrix} 1 & 1 & 1 & 0 & 0 & 0 & 0 & 0 & 0 & 0 \\ 0 & 1 & 1 & 1 & 0 & 0 & 0 & 0 & 0 & 0 \\ 0 & 0 & 1 & 1 & 1 & 0 & 0 & 0 & 0 & 0 \\ 0 & 0 & 0 & 1 & 1 & 1 & 0 & 0 & 0 & 0 \\ 0 & 0 & 0 & 0 & 1 & 1 & 1 & 0 & 0 & 0 \\ 0 & 0 & 0 & 0 & 0 & 1 & 1 & 1 & 0 & 0 \\ 0 & 0 & 0 & 0 & 0 & 0 & 1 & 1 & 1 & 0 \\ 0 & 0 & 0 & 0 & 0 & 0 & 0 & 1 & 1 & 1 \\ 1 & 0 & 0 & 0 & 0 & 0 & 0 & 0 & 1 & 1 \\ 1 & 1 & 0 & 0 & 0 & 0 & 0 & 0 & 0 & 1 \end{bmatrix} \cdot \begin{bmatrix} X1 \\ X2 \\ X3 \\ X4 \\ X5 \\ X6 \\ X7 \\ X8 \\ X9 \\ X10 \end{bmatrix}$$

[Equation 3]

Sensing elements 312 rearranged according to Equation 3 may be as shown in FIG. 3. The first sensing element S1 may be covered by a first lens. The eighth sensing element S8 may be covered by a third lens. A fifth sensing element (e.g., S5) may be covered by a second lens. Since sensing information sensed in each sensing element corresponds to a pixel constituting an image, the image sensor and/or imaging device may rearrange pixels such that sensing information corresponding to rays passing through different lenses are adjacent. A reconstructed image 325 may be an image in which pixel positions of pixels having sensing values obtained by sensing elements receiving similar light field information in low-resolution images 321, 322, 323, and 324 captured by individual lenses are arranged to be adjacent.

Figure 4:
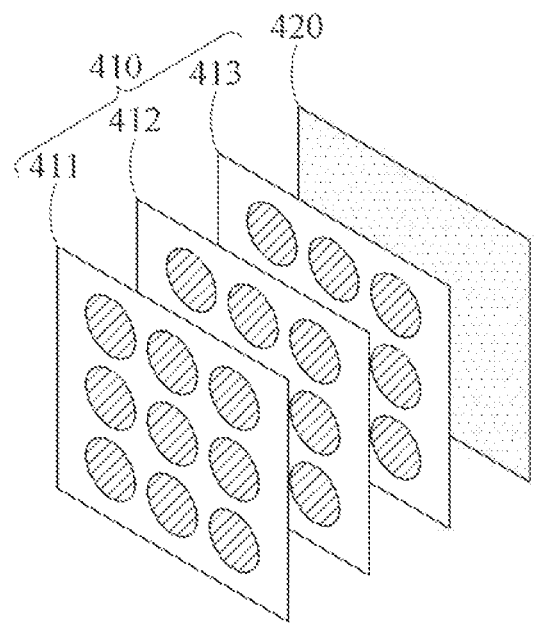
FIG. 4 illustrates a multi-layer multi lens array (MMLA) of an imaging device according to an example embodiment.

FIG. 4 illustrates a multi-layer multi lens array (MMLA) of an imaging device according to an example embodiment. Referring to FIG. 4, an imaging device may include an MMLA 410. The MMLA 410 may include a first lens array 411 of a first layer, a second lens array 412 of a second layer, and a third lens array 413 of a third layer. For convenience of understanding, other components such as a condensing lens and a filter are omitted in FIG. 4 and lens arrays, for example, the first lens array 411, the second lens array 412, and the third lens array 413 may correspond to imaging lens arrays. Hereinafter, the imaging lens arrays may also be referred to as lens arrays for brevity.

The lens arrays 411, 412, and 413 may each include a plurality of lens elements arranged in a form of an array. For example, each of the lens arrays 411, 412, and 413 may have a lens arrangement of 3*3 or 5*5. However, embodiments are not limited thereto, and the lens elements may also be arranged in other various patterns. FIG. 4 shows a 3*3 lens arrangement. The lens arrays 411, 412, and 413 may be arranged on an image sensor 420. A sensing array of the image sensor 420 may include a plurality of sensing elements that senses light passing through the lens elements of the lens arrays 411, 412, and 413.

Since each of the lens arrays 411, 412, and 413 includes the plurality of lens elements, a focal length required for each of the lens elements to achieve a desired resolution may be reduced. Accordingly, a lens assembly based on the MMLA 410 may have a total track length (TTL) within several millimeters (mm). In addition, as an ultra-thin camera device, the imaging device may capture high-resolution images at various zoom magnifications. The imaging device may be installed in an electronic device having a housing with a thickness of, for example, about several millimeters.

Figure 5:
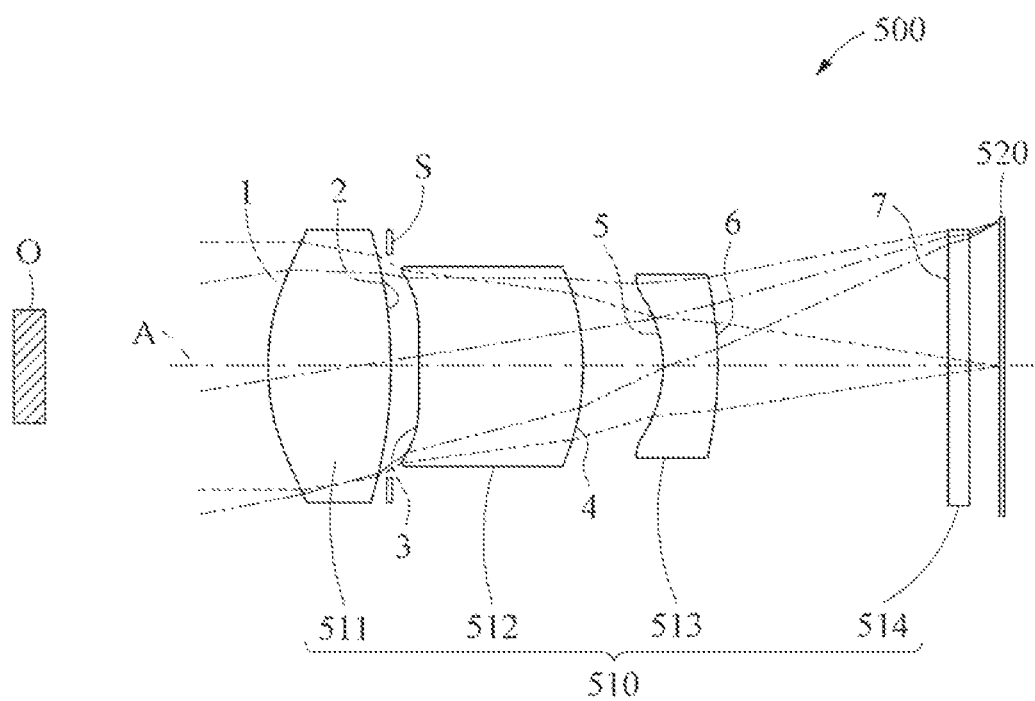
FIG. 5 illustrates a structure of each lens of an imaging device according to an example embodiment.

FIG. 5 illustrates a structure of each lens of an imaging device according to an example embodiment. Referring to FIG. 5, an imaging device 500 includes a lens assembly 510 and an image sensor 520. The lens assembly 510 may include a first lens 511, a second lens 512, a third lens 513, and a filter 514 arranged from a side of an object O toward a side of the image sensor 520. An aperture stop S may be disposed between the first lens 511 and the second lens 512. The first lens 511, the second lens 512, the third lens 513, the filter 514, and the image sensor 520 may be aligned on an optical axis A.

The first lens 511 may have positive refractive power. The second lens 512 and the third lens 513 may have negative refractive power. The first lens 511 may have a biconvex shape that is convex toward the side of the subject O and the side of the image sensor 520. Each of the second lens 512 and the third lens 513 may have a meniscus shape that is convex toward the side of the image sensor 520. The filter 514 may pass or block light of a predetermined wavelength band. For example, the filter 514 may be a low pass filter and/or a cover glass and may block infrared rays. For example, the first lens 511, the second lens 512, and the third lens 513 may be aspherical lenses made of plastic.

A field of view (FoV) of the lens assembly 510 may satisfy a condition according to Equation 4 below.

$$0.25 < \tan(FoV) < 0.5$$ [Equation 4]

In Equation 4, tan denotes a tangent function and FoV denotes a field of view of the lens assembly 510 based on a combined focal length of the lens assembly 510. The combined focal length may be obtained by combining focal lengths of all lenses, for example, the first lens 511, the second lens 512, and the third lens 513 of the lens assembly 510. A high magnification zoom may be configured according to Equation 4, and the lens assembly 510 may serve as a telescope lens. The field of view according to Equation 4 may correspond to a zoom magnification of about 4 to 6.5 times compared to a focal length of a wide-angle camera of a general mobile device (e.g., a smartphone). In the present disclosure, Equation 4 may also be referred to as Conditional expression 1.

A telephoto ratio of the lens assembly 510 may satisfy a condition according to Equation 5.

$$TTL/f < 1.0$$ [Equation 5]

In Equation 5, TTL denotes a total track length of the lens assembly 510 and f denotes a combined focal length of the lens assembly 510. According to Equation 5, the lens assembly 510 may have the total track length within several millimeters, and an imaging device including the lens assembly 510 may be implemented as an ultra-thin camera. In addition, the imaging device may be installed in an electronic device having a housing with a thickness of, for example, about several millimeters. If the telephoto ratio is not small as shown in Equation 5, telephoto performance of the lens assembly 510 may increase, but the size of the lens assembly 510 may also increase according to an increase in zoom magnification. Thus, the condition according to Equation 5 needs to be satisfied to implement an ultra-small and ultra-thin camera module. In the present disclosure, Equation 5 may also be referred to as Conditional expression 2.

The first lens 511 may have a biconvex shape to achieve large positive refractive power. Based on the large positive refractive power, the high zoom magnification according to Equation 4 and the small telephoto ratio according to Equation 5 may be achieved. In addition, the second lens 512 and the third lens 513 may have a meniscus shape that is convex toward a side of the image sensor 520 so as to offset aberrations (e.g., a spherical aberration and a field curvature aberration) increasing based on the shape of the first lens 511. Through such configuration of the first lens 511, the second lens 512, and the third lens 513, imaging performance of the lens assembly 510 may be maximized. In addition to the aberrations related to the imaging performance, a distortion aberration caused by a power configuration of each lens may be effectively reduced through an aperture (e.g., an aperture stop S) disposed between the first lens 511 and the second lens 512.

In a state that Conditional expression 2 is satisfied through the first lens 511 having the biconvex shape and the second lens 512 and the third lens 513 having the meniscus shape that is convex toward the side of the image sensor 520, when the power configuration of the second lens 512 and the third lens 513 is appropriately performed, an effective aperture of a lens (e.g., the first lens 511) of the lens assembly 510 may be smaller than a diameter of an image circle. As described below, the lenses 511, 512, and 513 may include respective lens arrays. In this case, an aperture of each lens of the lens array may be smaller than a size of an image so that the image is effectively imaged on one image sensor 520 through the lens array. Through this, lenses may be appropriately arranged in a lens array of each layer. In addition, since there is no interference between the lenses, manufacturing process may be facilitated.

Accordingly, the power configuration of the second lens 512 and the third lens 513 may satisfy Equation 6 below.

$$1.6 < (1/f3)/(1/f2) < 2.5 \quad \text{[Equation 6]}$$

In Equation 6, f2 denotes the focal length of the second lens 512 and f3 denotes the focal length of the third lens 513. In Equation 6, (1/f3)/(1/f2) may be referred to as a power ratio of the second lens 512 and the third lens 513. When the power ratio is less than 1.6, the spherical aberration and/or the field curvature aberration may be increased. When the power ratio is greater than 2.5, a desired telephoto ratio may not be achieved due to an increase in total track length. Equation 6 may also be referred to as Conditional expression 3.

Hereinafter, numerical examples of the lens assembly 510 will be described. In each of the numerical examples, 1 through N (N being a natural number) represent numbers of lens surfaces and be sequentially allocated in a direction from a side of the subject O to a side I of the image sensor 520. The numbers of the lens surfaces are also shown in FIG. 5. S denotes an aperture stop and IMAG denotes the image sensor 520.

Numerical Example 1

Table 1 shows lens data of the lens assembly 510 according to Numerical example 1.

TABLE 1

|  | Radius | Thickness | Index |
|---|---|---|---|
| 1 | 3.6905 | 1.830 | 5441.561 |
| 2 | −18.5617 | 0.638 |  |
| S | infinity | 0 |  |
| 3 | −6.643 | 2.639 | 671.206 |
| 4 | −16.3104 | 1.082 |  |
| 5 | −5.4542 | 0.76 | 544.1561 |
| 6 | 30.2910 | 4.022 |  |
| 7 | infinity | 0.22 | 516.642 |
| IMAG | infinity | 1.113 |  |

Table 2 and Table 3 show aspherical coefficients of Numerical example 1.

TABLE 2

|  | 1 | 2 | 3 |
|---|---|---|---|
| K | −0.61268 | 0.00000 | −6.38482 |
| A | 3.37988E−04 | −9.99243E−04 | 1.34619E−03 |
| B | −1.10522E−04 | −4.02458E−04 | −3.91113E−04 |
| C | −1.50084E−05 | −7.61011E−05 | −1.57717E−05 |
| D | −5.74510E−06 | −6.74801E−06 | −1.28502E−05 |
| E | −6.05371E−07 | −2.27738E−07 | −6.75299E−07 |
| F | 8.69804E−09 | 5.01396E−08 | 1.25085E−06 |
| G | −4.99430E−11 | 2.81850E−08 | −6.34586E−08 |
| H | −5.52733E−09 | −1.56288E−09 | 0.00000E+00 |
| J | 0.00000E+00 | 0.00000E+00 | 0.00000E+00 |

TABLE 3

|  | 4 | 5 | 6 |
|---|---|---|---|
| K | 19.65864 | 0.00000 | 0.00000 |
| A | 6.13057E−04 | −4.09952E−02 | −2.74207E−02 |
| B | −6.66323E−05 | 1.47660E−04 | 4.76042E−03 |
| C | −5.78133E−04 | 3.86970E−06 | −1.34052E−03 |
| D | 2.10381E−04 | −2.54428E−04 | 5.28384E−04 |
| E | 2.21010E−06 | 8.49155E−05 | −8.83582E−05 |
| F | −2.40557E−05 | 1.81361E−06 | −1.65705E−06 |
| G | 4.85132E−06 | 5.30627E−06 | 2.63944E−06 |
| H | 9.27095E−08 | 1.01964E−06 | −2.20404E−07 |
| J | 0.00000E+00 | −3.64815E−07 | 3.05573E−09 |

Numerical Example 2

Table 4 shows lens data of the lens assembly 510 according to Numerical example 2.

TABLE 4

|  | Radius | Thickness | Index |
|---|---|---|---|
| 1 | 1.8591 | 0.893 | 5441.561 |
| 2 | −10.3946 | 0.321 |  |
| S | infinity | 0 |  |
| 3 | −3.4331 | 1.309 | 671.206 |
| 4 | −9.3017 | 0.736 |  |
| 5 | −2.4153 | 0.37 | 544.1561 |
| 6 | 248.7439 | 2.011 |  |
| 7 | infinity | 0.11 | 516.642 |
| IMAG |  | 0.3717 |  |

Table 5 and Table 6 shows aspherical coefficients of Numerical example 2.

TABLE 5

|  | 1 | 2 | 3 |
|---|---|---|---|
| K | −0.62427 | 0.00000 | −5.55572 |
| A | 0.00254 | −0.01100 | 0.00453 |
| B | −0.00445 | −0.01728 | −0.02230 |
| C | −0.00097 | −0.01380 | 0.00407 |
| D | −0.00481 | −0.00255 | −0.01223 |
| E | −0.00256 | 0.00146 | −0.00176 |
| F | 0.00084 | 0.00093 | 0.02439 |
| G | 0.00129 | 0.00033 | −0.01262 |
| H | −0.00182 | −0.00053 | 0.00000 |
| J | 0.00000 | 0.00000 | 0.00000 |

TABLE 6

|   | 4 | 5 | 6 |
|---|---|---|---|
| K | 48.25025 | 0.00000 | 0.00000 |
| A | −0.00523 | −0.42569 | −0.30571 |
| B | 0.01597 | 0.00425 | 0.23818 |
| C | −0.13181 | 0.02213 | −0.40025 |
| D | 0.20499 | −0.16787 | 0.83392 |
| E | 0.02557 | 0.17391 | −0.93678 |
| F | −0.37489 | 0.01486 | 0.37155 |
| G | 0.26247 | 0.17388 | 0.08649 |
| H | 0.01215 | 0.13365 | −0.02889 |
| J | 0.00000 | −0.19127 | 0.00160 |

Numerical Example 3

Table 7 shows lens data of the lens assembly 510 according to Numerical example 3.

TABLE 7

|   | Radius | Thickness | Index |
|---|---|---|---|
| 1 | 1.8751 | 0.872 | 5441.561 |
| 2 | −17.0825 | 0.338 |   |
| S | Infinity | 0 |   |
| 3 | −4.2687 | 1.3531 | 671.206 |
| 4 | −18.6149 | 0.930 |   |
| 5 | −2.1426 | 0.404 | 544.1561 |
| 6 | −12.3056 | 1.827 |   |
| 7 | infinity | 0.11 | 516.642 |
| IMAG |   | 0.3 |   |

Table 8 and Table 9 shows aspherical coefficients of Numerical example 3.

TABLE 8

|   | 1 | 2 | 3 |
|---|---|---|---|
| K | −0.54958 | 0.00000 | −5.23719 |
| A | 0.00390 | −0.00414 | 0.00958 |
| B | −0.00296 | −0.00706 | −0.01212 |
| C | 0.00168 | −0.00693 | 0.01256 |
| D | −0.00279 | 0.00195 | −0.00779 |
| E | −0.00181 | 0.00402 | 0.00112 |
| F | 0.00104 | 0.00175 | 0.02558 |
| G | 0.00165 | −0.00028 | −0.02193 |
| H | −0.00101 | −0.00210 | 0.00000 |
| J | 0.00000 | 0.00000 | 0.00000 |

TABLE 9

|   | 4 | 5 | 6 |
|---|---|---|---|
| K | 36.79673 | 0.00000 | 0.00000 |
| A | 0.00766 | −0.30782 | −0.22395 |
| B | 0.01546 | 0.02823 | 0.19828 |
| C | −0.11007 | 0.07174 | −0.43913 |
| D | 0.22272 | −0.34484 | 0.91634 |
| E | 0.00347 | 0.17391 | −1.06105 |
| F | −0.41674 | 0.01486 | 0.44005 |
| G | 0.29294 | 0.17388 | 0.08649 |
| H | 0.01215 | 0.13365 | −0.02889 |
| J | 0.00000 | −0.19127 | 0.00160 |

In the above numerical examples, the aspherical coefficients may be defined as shown in Equation 7 below.

$$Z(r) = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} + Jr^{20} \quad \text{[Equation 7]}$$

In Equation 7, Z(r) denotes a distance from a vertex of the lens toward the optical axis A, c denotes an inverse number (1/R) of a radius of curvature based on the vertex of the lens, r denotes a vertical distance from the optical axis A, k denotes a Conic constant, and A, B, C, D, E, and F denote aspherical coefficients.

Table 10 shows variable values of each of the conditional expressions obtained according to each of the numerical examples of the lens assembly 510. Table 11 shows results obtained by substituting the variable values of Table 10 into each of the conditional expressions. Referring to Table 11, each of the numerical examples satisfies all conditional expressions.

TABLE 10

|   | f | TTL | FoV | f1 | f2 | f3 |
|---|---|---|---|---|---|---|
| Numerical example 1 | 13.68 | 12.3 | 19.8 | 5.8 | −18.54 | −8.38 |
| Numerical example 2 | 6.82 | 6.12 | 20 | 2.96 | −8.8 | −4.7 |
| Numerical example 3 | 6.83 | 6.13 | 20 | 3.14 | −8.47 | −4.8 |

TABLE 11

|   | Conditional expression 1 | Conditional expression 2 | Conditional expression 3 |
|---|---|---|---|
| Numerical example 1 | 0.360 | 0.899 | 2.212 |
| Numerical example 2 | 0.364 | 0.897 | 1.872 |
| Numerical example 3 | 0.364 | 0.898 | 1.764 |

Figure 6A:
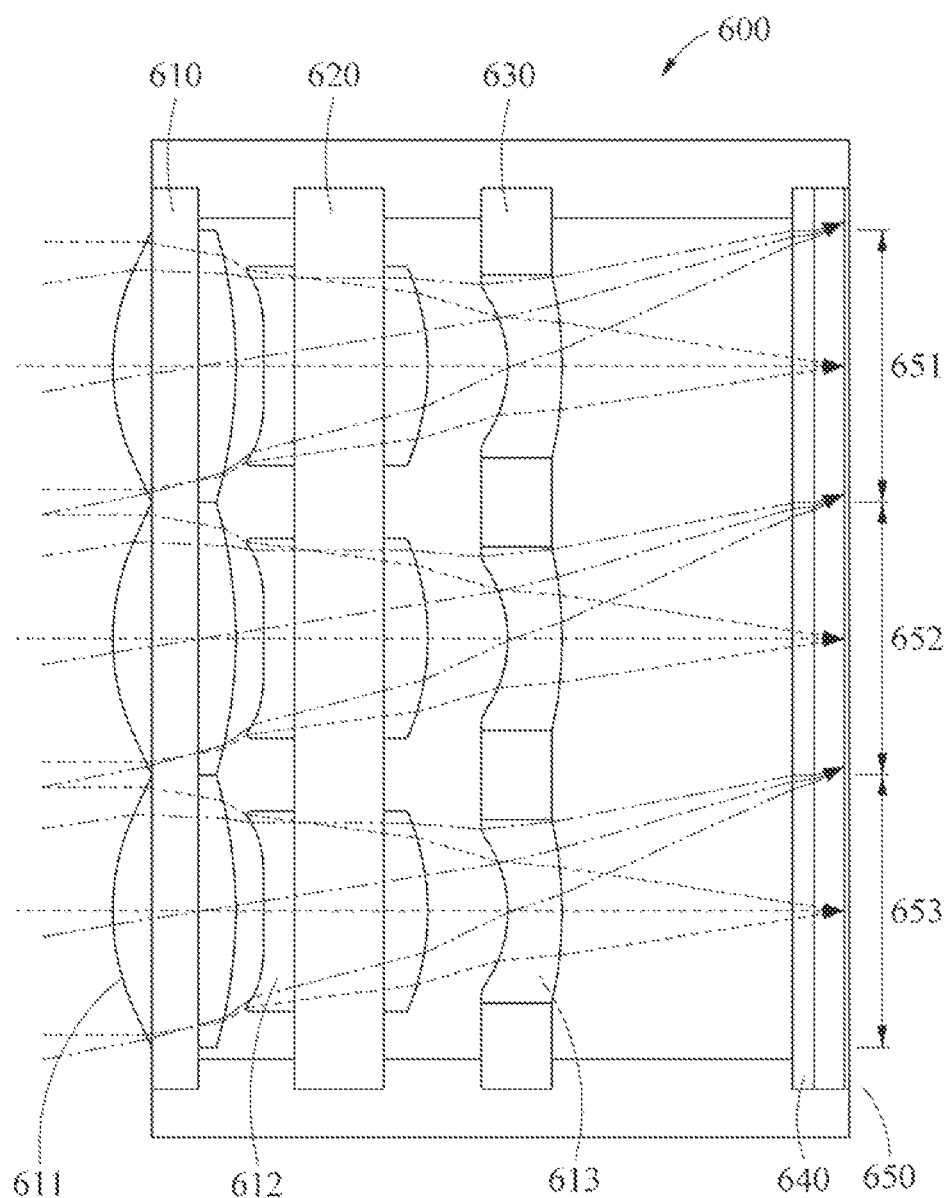
FIG. 6A illustrates lens arrays of an imaging device including lenses of FIG. 5
Figure 6B:
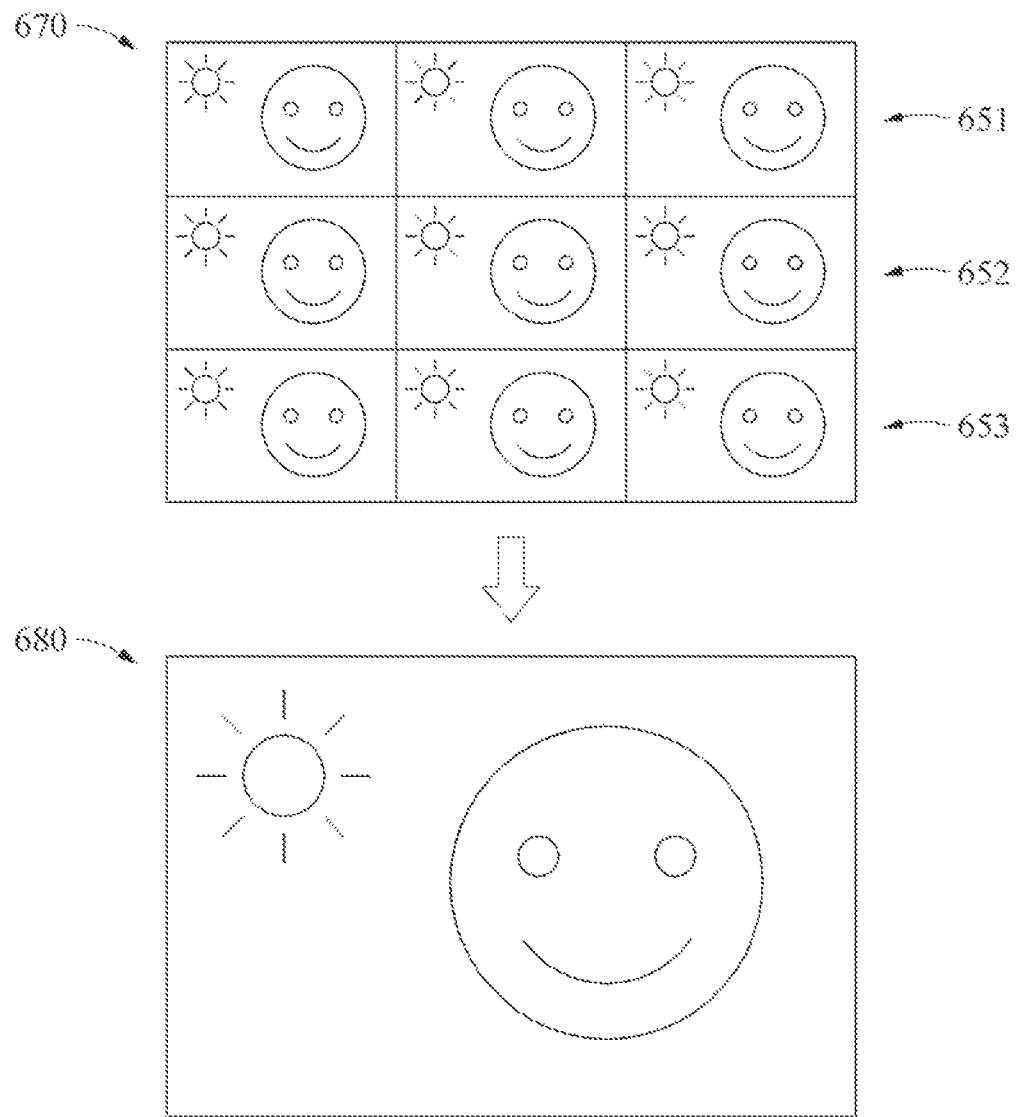
FIG. 6B illustrates low-resolution images and rearranged images acquired through a lens array of FIG. 6A.

FIG. 6A illustrates lens arrays of an imaging device including lenses of FIG. 5 and FIG. 6B illustrates low-resolution images and rearranged images acquired through a lens array of FIG. 6A. FIG. 5 illustrates an example in which a lens assembly includes one lens in each layer, and thus includes a total of three lenses. In contrast, FIG. 6A illustrates an example of an MMLA in which a lens assembly includes a lens array including a plurality of lenses in each layer. In an MMLA structure, when a number of lenses placed in one layer increases, a focal length required for a same field of view may decrease. Through this, a total track length of the lens assembly may be further reduced.

Referring to FIG. 6A, an imaging device 600 includes lens arrays, for example, a first lens array 610, a second lens array 620, and a third lens array 630, a filter 640, and an image sensor 650. The first lens array 610 may include a first lens, for example, a lens 611. The second lens array 620 may include a second lens, for example, a lens 612. The third lens array 630 may include a third lens, for example, a lens 613. In the lens arrays 610, 620, and 630, the lenses 611, 612, and 613 may be arranged based on a lens arrangement such as 3*3 and 5*5. Values such as 3*3 and 5*5 are merely an example, and other various lens arrangements may be applicable. FIG. 6A is a side view illustrating a 3*3 lens arrangement as an example. For ease of manufacturing, the lens arrays 610, 620, and 630 may be formed of a plastic material. In this case, the lens arrays 610, 620, and 630 may have a shape that each plastic lens is inserted into a plastic plate.

The lenses 611, 612, and 613 correspond to the lenses 511, 512, and 513 of FIG. 5. For example, the lenses 611, 612, and 613 may satisfy Conditional expressions 1 through 3. Likewise, the lenses 611, 612, and 613 may have the same attributes, for example, the field of view, the telephoto ratio, the power configuration, and the lens data as the lenses 511, 512, and 513 described with reference to FIG. 5. Also, an effective aperture of each lens (e.g., the first lens 611) of each layer may be smaller than a diagram of an image circle. Accordingly, an image may be more effectively imaged on each area of one image sensor 620 through each lens array. Also, lenses may be appropriately arranged in a lens array of each layer without interference.

In FIG. 6A, dashed arrows indicate paths of light provided to the image sensor 650. Each of the paths reaching areas (e.g., a first area 651, a second area 652, and a third area 653) of the image sensor 650 pass each lens of each layer. For example, rays of light passing through the first lens 611, the second lens 612, and the third lens 613 may reach the third area 653. The rays of light may gather to form sensing information of the third area 653. This is based on the same principle as that rays of light passing through the lenses 511, 512, and 513 gather to form sensing information in the image sensor 520 in the example of FIG. 5.

Low-resolution images 670 of FIG. 6B may be acquired through the image sensor 650. For example, a first row of the low-resolution images 670 may be acquired through the first area 651 of the image sensor 650, a second row may be acquired through the second area 652, and a third row may be acquired through the third area 653. The low-resolution images 670 may include different light field information of individual points corresponding to an object. A rearranged image 680 may be obtained by rearranging each pixel position of the low-resolution images 670 based on a correlation between the light field information.

Figure 7:
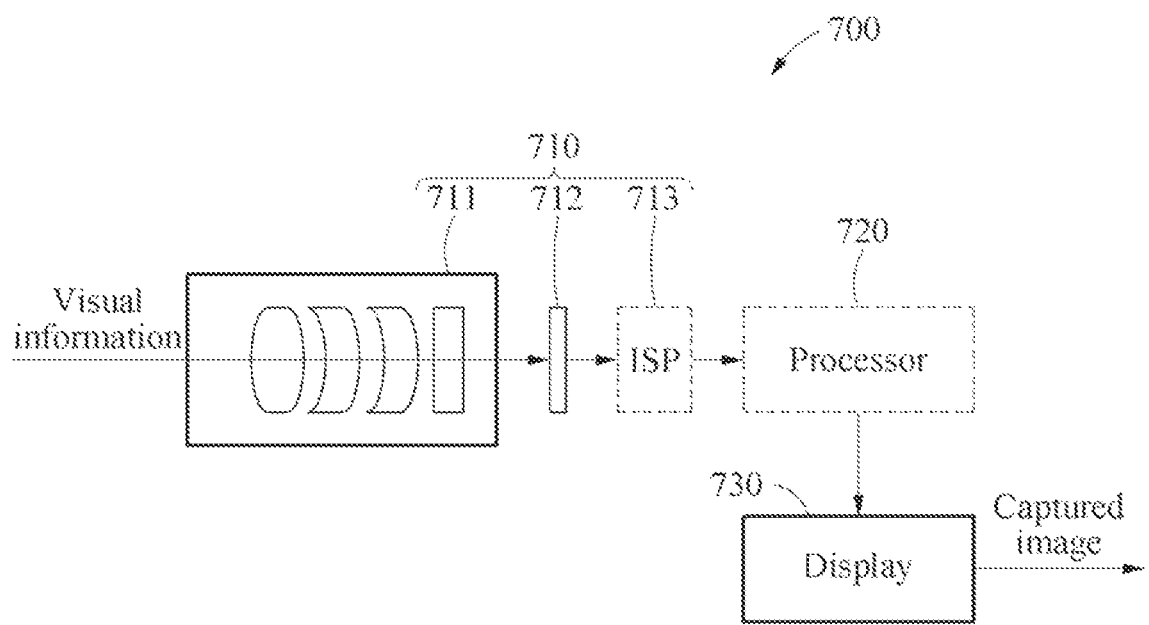
FIG. 7 illustrates a configuration and a structure of an electronic device according to an example embodiment.

FIG. 7 illustrates a configuration and a structure of an electronic device according to an example embodiment. Referring to FIG. 7, an electronic device 700 includes an imaging device 710, a processor 720, and a display 730. The imaging device 710 may include a lens assembly 711, an image sensor 712, and an image signal processor (ISP) 713. The imaging device 710 may correspond to any one of the imaging device 500 of FIG. 5 and the imaging device 600 of FIG. 6. The lens assembly 711 may include one lens in each layer as shown in FIG. 5 or include a lens array in each layer as shown in FIG. 6A.

The image sensor 712 may generate sensing information corresponding to visual information. The ISP 713 and the processor 720 may perform processing for converting the sensing information into a captured image. As an example, the ISP 713 may perform preprocessing on sensing information, so that the processor 720 generates a captured image based on a result of the preprocessing. As another example, the ISP 713 or the processor 720 may perform overall processing for generating a captured image. In this case, one of the ISP 713 or the processor 720 except for a performer of the corresponding processing may be omitted. The display 730 may display the captured image.

Figure 8:
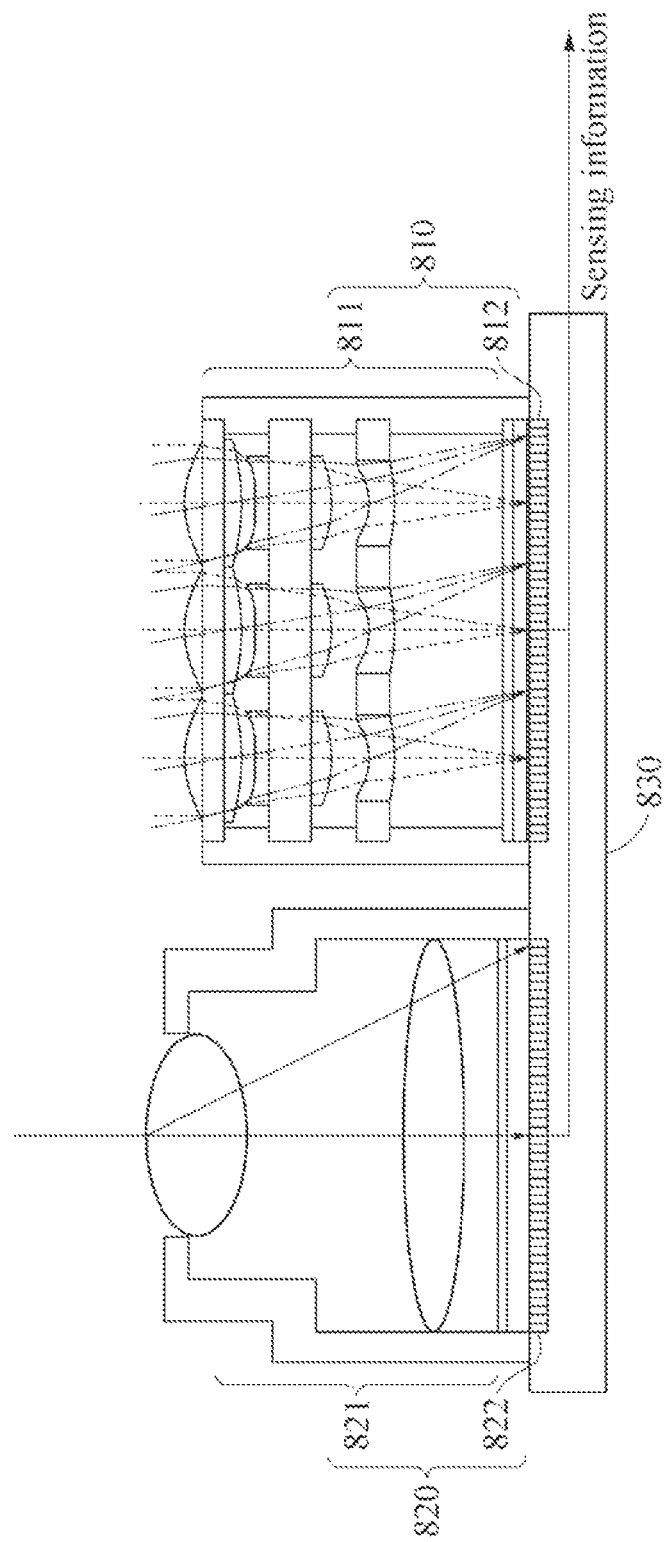
FIG. 8 illustrates configurations and structures of imaging devices according to an example embodiment.

FIG. 8 illustrates configurations and structures of imaging devices according to an example embodiment. FIG. 8 shows a first imaging device 810 and a second imaging device 820. An electronic device may capture images at various fields of view through a plurality of imaging modules such as the first imaging device 810 and the second imaging device 820. FIG. 8 illustrates two imaging devices, the first imaging device 810 and the second imaging device 820, but three or more imaging devices may be included in the electronic device.

The first imaging device 810 includes a first lens assembly 811 and a first image sensor 812. The first imaging device 810 may capture first visual information at a first field of view through the first lens assembly 811. The second imaging device 820 includes a second lens assembly 821 and a second image sensor 822. The second imaging device 820 may capture second visual information at a second field of view through the second lens assembly 821. The first field of view may be narrower than the second field of view. For example, the first field of view may correspond to a telephoto and the second field of view may correspond to a wide angle. The first image sensor 812 may generate first sensing information corresponding to the first visual information. The second image sensor 822 may generate second sensing information corresponding to the second visual information. A processor (e.g., the ISP 713 and/or the processor 720 of FIG. 7) of the electronic device may generate a captured image based on the first sensing information and/or the second sensing information. A display of the electronic device may display the captured image.

The first imaging device 810 may correspond to any one of the imaging device 500 of FIG. 5 and the imaging device 600 of FIG. 6. Thus, the first imaging device 810 may have a narrow field of view and a small telephoto ratio so as to be implemented in an ultra-small and ultra-thin size. In addition, based on characteristics of lenses, combined characteristics of the lenses, and characteristics of a lens array, the first imaging device 810 may achieve the ultra-small and ultra-thin size without needing to use a folded architecture. Accordingly, unlike a camera of the folded architecture, the first imaging device 810 and the second imaging device 820 may be mounted on a same substrate 830. The substrate 830 may be, for example, a printed circuit board (PCB). Also, the first image sensor 812 of the first imaging device 810 and the second image sensor 822 of the second imaging device 820 may be present on a same plane. In a case of the folded architecture, as an additional component or device such as a reflective member is horizontally disposed in the electronic device, sensitive optical axis alignment and arrangement of a lens system, a sensor, and a wiring are required. The first imaging device 810 may be vertically disposed in the electronic device and thus, may be more easily manufactured compared to the folded architecture.

Figure 9:
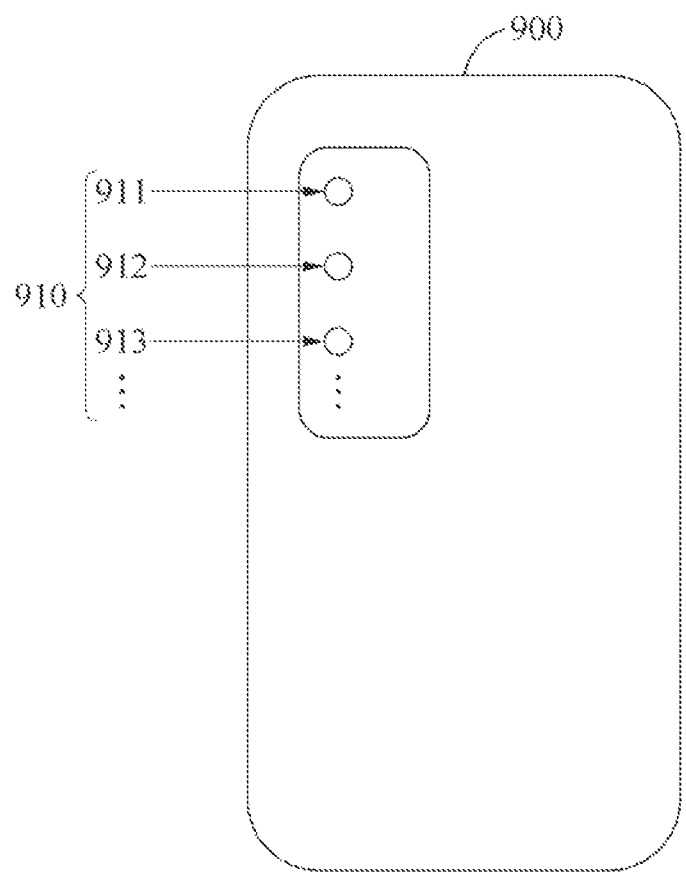
FIG. 9 illustrates an example of the imaging devices of FIG. 8 installed in an electronic device.

FIG. 9 illustrates an example of the imaging devices of FIG. 8 installed in an electronic device. Referring to FIG. 9, an electronic device 900 includes an imaging device 910. The imaging device 910 includes imaging devices 911, 912, and 913. For example, the imaging devices 911, 912, and 913 may include the first imaging device 810 and the second imaging device 820 of FIG. 8. Although FIG. 9 illustrates the imaging device 910 as a rear camera of a smartphone, it is merely an example. In some cases, the imaging device 910 may be a front camera of a smartphone.

FIG. 9 illustrates the electronic device 900 as the smartphone. However, in addition to the smartphone, the electronic device 900 may also be implemented in a mobile device such as a personal digital assistant (PDA), a netbook, a tablet computer, and a laptop computer, a wearable device such as smart watch, a smart band, and a smart glass, a computing device such as a desktop computer and a server, home appliances such as a television (TV), a smart TV, and a refrigerator, a security device such as a door lock and a closed circuit television (CCTV), a vehicle such as an autonomous vehicle and a smart vehicle, a camera such as a virtual reality (VR)/augmented reality (AR) camera, a 360-degree capturing camera, an insect eye camera, and a contact lens type camera, and a drone, for example.

Figure 10:
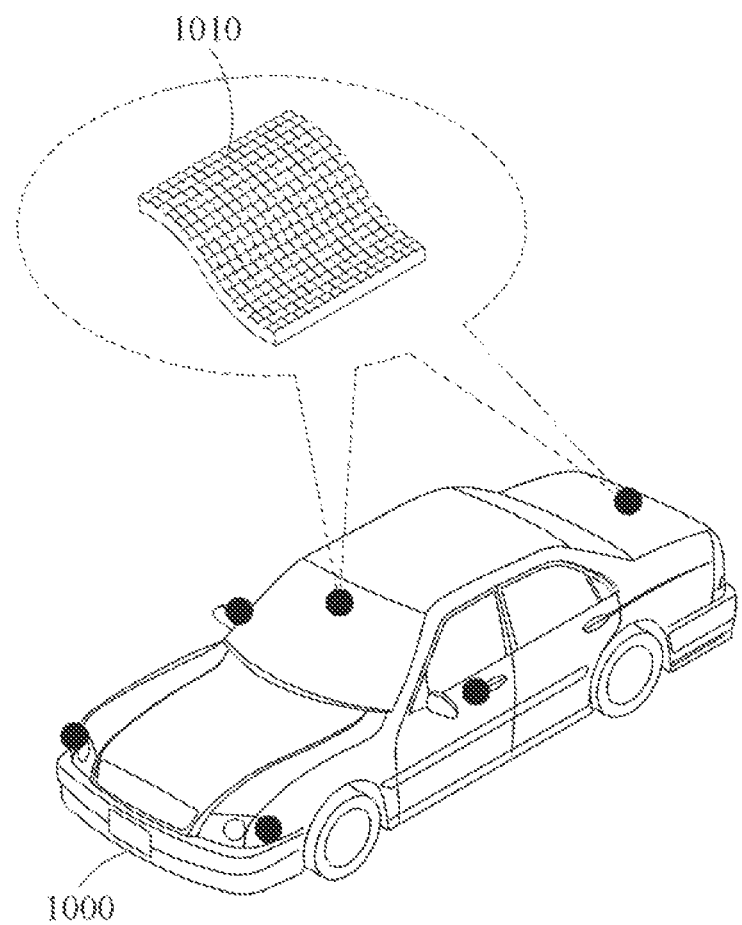
FIG. 10 illustrates imaging devices installed in a vehicle according to an example embodiment.

FIG. 10 illustrates imaging devices installed in a vehicle according to an example embodiment. Referring to FIG. 10, an imaging device 1010 may be installed at various positions of a vehicle 100 as indicated by black dots. Installation positions of FIG. 10 are merely an example, and the imaging device may also be installed at other positions in the vehicle 1000. The imaging device 1010 may be implemented in the vehicle 1000 to have an ultra-thin structure and/or a curved structure.

The example embodiments described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

The above-described hardware devices may be configured to act as one or more software devices in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other embodiments. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A lens assembly comprising:
a first lens array comprising a plurality of first lenses, the plurality of first lenses respectively having positive refractive power and being provided in a direction perpendicular to an optical axis of the lens assembly;
a second lens array comprising a plurality of second lenses, the plurality of second lenses respectively having negative refractive power and being provided in the direction perpendicular to the optical axis of the lens assembly; and
a third lens array comprising a plurality of third lenses, the plurality of third lenses respectively having negative refractive power and being provided in the direction perpendicular to the optical axis of the lens assembly,
wherein the first lens array, the second lens array, and the third lens array are sequentially arranged from an object side toward an image sensor side,
wherein each first lens of the plurality of first lenses has a biconvex shape that is convex toward the object side and convex toward the image sensor side,
wherein each second lens of the plurality of second lenses and each third lens of the plurality of third lenses has a meniscus shape that is convex toward the image sensor side, and
wherein a focal length of each second lens of the plurality of second lenses is f2 and a focal length of each third lens of the plurality of third lenses is f3, and a power configuration of the lens assembly satisfies:

$$1.6 < (1/f3)/(1/f2) < 2.5.$$

2. The lens assembly of claim 1, wherein a total track length of the lens assembly is TTL and a combined focal length of the lens assembly is f', and a telephoto ratio of the lens assembly satisfies:

$$TTL/f<1.0.$$

3. The lens assembly of claim 1, wherein a field of view of the lens assembly is FoV, and the field of view satisfies:

$$0.25<\tan(FoV)<0.5.$$

4. The lens assembly of claim 1, wherein at least one of each first lens of the plurality of first lenses, each second lens of the plurality of second lenses, and each third lens of the plurality of third lenses is an aspherical lens formed of a plastic material.

5. The lens assembly of claim 1, wherein at least one of the first lens array, the second lens array, and the third lens array has a 3×3 lens arrangement or 5×5 lens arrangement.

6. The lens assembly of claim 1, further comprising:
an aperture stop provided between the first lens array and the second lens array.

7. The lens assembly of claim 1, wherein an effective aperture of each first lens of the plurality of first lenses is smaller than a diameter of an image circle.

8. A lens assembly comprising:
a first lens having positive refractive power;
a second lens having negative refractive power; and
a third lens having negative refractive power,
wherein the first lens, the second lens, and the third lens are sequentially arranged from an object side toward an image sensor side,
wherein the first lens has a biconvex shape that is convex toward the object side and convex toward the image sensor side,
wherein each of the second lens and the third lens has a meniscus shape that is convex toward the image sensor side,
wherein a total track length of the lens assembly is TTL, a combined focal length of the lens assembly is f', a field of view of the lens assembly is FoV, a telephoto ratio of the lens assembly satisfies TTL/f'<1.0, and the field of view satisfies 0.25<tan(FoV)<0.5, and
where a focal length of the second lens is f2, a focal length of the third lens is f3, and a power configuration of the lens assembly satisfies:

$$1.6<(1/f3)/(1/f2)<2.5.$$

9. The lens assembly of claim 8, wherein at least one of the first lens, the second lens, and the third lens is an aspherical lens formed of a plastic material.

10. The lens assembly of claim 8, further comprising:
an aperture stop provided between the first lens and the second lens.

11. The lens assembly of claim 8, wherein the first lens, the second lens, and the third lens are included in lens arrays that are provided in different layers.

12. An electronic device comprising:
a first imaging device configured to capture first visual information through a first lens assembly at a first field of view; and
a display configured to display a captured image based on sensing information corresponding to the first visual information,
wherein the first lens assembly comprises:
a first lens array comprising a plurality of first lenses, the plurality of first lenses respectively having positive refractive power and being provided in a direction perpendicular to an optical axis of the first lens assembly;
a second lens array comprising a plurality of second lenses, the plurality of second lenses respectively having negative refractive power and being provided in the direction perpendicular to the optical axis of the first lens assembly; and
a third lens array comprising a plurality of third lenses, the plurality of third lenses respectively having negative refractive power and being provided in the direction perpendicular to the optical axis of a lens assembly,
wherein the first lens array, the second lens array, and the third lens array are sequentially arranged from an object side toward an image sensor side,
wherein each first lens of the plurality of first lenses has a biconvex shape that is convex toward the object side and convex toward the image sensor side,
wherein each second lens of the plurality of second lenses and each third lens of the plurality of third lenses has a meniscus shape that is convex toward the image sensor side,
wherein a focal length of each second lens of the plurality of second lenses is f2 and a focal length of each third lens of the plurality of third lenses is f3, and a power configuration of the lens assembly satisfies:

$$1.6<(1/f3)/(1/f2)<2.5.$$

13. The electronic device of claim 12, further comprising:
a second imaging device configured to capture second visual information through a second lens assembly at a second field of view,
wherein the first field of view is narrower than the second field of view.

14. The electronic device of claim 13, wherein the first imaging device and the second imaging device are provided on a substrate.

15. The electronic device of claim 13, wherein a first image sensor included in the first imaging device and a second image sensor included in the second imaging device are provided on a same plane.

16. The electronic device of claim 12, wherein a total track length of the first lens assembly is TTL, a combined focal length of the first lens assembly is f, and a telephoto ratio of the first lens assembly satisfies:

$$TTL/f<1.0.$$

17. The electronic device of claim 12, wherein a field of view of the first lens assembly is FoV and the field of view satisfies:

$$0.25<\tan(FoV)<0.5.$$

18. An device assembly comprising:
a substrate;
a first imaging device provided on the substrate and configured to capture first visual information through a first lens assembly at a first field of view, the first lens assembly comprising:
a first lens array comprising a plurality of first lenses, the plurality of first lenses respectively having positive refractive power and being provided in a direction perpendicular to an optical axis of a lens assembly;
a second lens array comprising a plurality of second lenses, the plurality of second lenses respectively having negative refractive power and being provided in the direction perpendicular to the optical axis of the lens assembly; and a third lens array comprising a plurality of third lenses, the plurality of third lenses respectively having negative refractive power and being provided in the direction perpendicular to the optical axis of the lens assembly, wherein the first lens array, the second lens array, and the third lens array are sequentially provided from an object side toward an image sensor side, wherein each first lens of the plurality of first lenses has a biconvex shape that is convex toward the object side and convex toward the image sensor side, wherein each second lens of the plurality of second lenses and each third lens of the plurality of third lenses has a meniscus shape that is convex toward the image sensor side, and wherein a focal length of each second lens of the plurality of second lenses is f2 and a focal length of each third lens of the plurality of third lenses is f3, and a power configuration of the lens assembly satisfies:

$1.6 < (1/f3)/(1/f2) < 2.5$; and a second imaging device provided on the substrate and configured to capture second visual information through a second lens assembly at a second field of view that is different from the first field of view.

\* \* \* \* \*